(12) United States Patent
Winter

(10) Patent No.: US 9,527,026 B2
(45) Date of Patent: Dec. 27, 2016

(54) METHOD AND APPARATUS FOR RECYCLING ASH FINES

(71) Applicant: John Winter, Houston, TX (US)

(72) Inventor: John Winter, Houston, TX (US)

(73) Assignee: Synthesis Energy Systems, Inc., Houston, TX (US)

( * ) Notice: Subject to any disclaimer, the term of this patent is extended or adjusted under 35 U.S.C. 154(b) by 85 days.

(21) Appl. No.: 14/211,012

(22) Filed: Mar. 14, 2014

(65) Prior Publication Data

US 2014/0260973 A1    Sep. 18, 2014

Related U.S. Application Data

(60) Provisional application No. 61/782,418, filed on Mar. 14, 2013.

(51) Int. Cl.
| | | |
|---|---|---|
| C10J 3/08 | (2006.01) | |
| C10J 3/22 | (2006.01) | |
| C01B 3/02 | (2006.01) | |
| B01J 8/44 | (2006.01) | |
| B01D 46/24 | (2006.01) | |
| B01J 8/18 | (2006.01) | |
| B01J 8/00 | (2006.01) | |

(52) U.S. Cl.
CPC ............ B01D 46/24 (2013.01); B01J 8/003 (2013.01); B01J 8/006 (2013.01); B01J 8/0025 (2013.01); B01J 8/0055 (2013.01); B01J 8/1872 (2013.01); B01J 8/44 (2013.01); B01J 2208/00752 (2013.01)

(58) Field of Classification Search
CPC ......... C10J 3/08; C10J 3/22; C10J 2300/1846; C10J 2300/1634; C10J 2300/1807; C01B 3/02; B01J 8/003; B01J 8/1818; B01J 8/44; B01J 2208/00761; B01J 2208/00778; B01J 2300/0973
USPC ......... 252/373; 422/630, 649, 613, 146, 144
See application file for complete search history.

(56) References Cited

U.S. PATENT DOCUMENTS

| | | | | |
|---|---|---|---|---|
| 5,821,270 | A * | 10/1998 | Chang ................ | B01J 8/005 502/21 |
| 2008/0282944 | A1* | 11/2008 | Tuzson ............... | F23G 7/105 110/259 |
| 2010/0040510 | A1* | 2/2010 | Randhava ........... | C01B 3/025 422/140 |
| 2010/0270506 | A1* | 10/2010 | Goetsch .............. | C10J 3/482 252/373 |
| 2011/0189054 | A1* | 8/2011 | Sheng ................. | B01J 8/003 422/139 |
| 2012/0111109 | A1* | 5/2012 | Chandran ........... | B01J 8/0055 73/32 R |
| 2012/0138861 | A1* | 6/2012 | Liu ..................... | F23C 10/10 252/373 |

(Continued)

*Primary Examiner* — Jacob T Minskey
*Assistant Examiner* — Minh-Chau Pham
(74) *Attorney, Agent, or Firm* — Kening Li; Miller Canfield

(57) ABSTRACT

A fluidized bed reactor including a reaction vessel, which contains a conical gas distribution grid, a first venturi connected to the bottom of the gas distribution grid, and a classifier connected to the bottom of the first venturi; a fine ash particle collection system; and a fine ash particle conveyor system. Also disclosed is a method for recycling fine ash particles, the method including separating the fine ash particles from an exit gas stream, and using a transport gas to deliver the fine ash particles into the classifier.

14 Claims, 7 Drawing Sheets

(56) References Cited

U.S. PATENT DOCUMENTS

| | | | |
|---|---|---|---|
| 2013/0030063 A1* | 1/2013 | Randhava | C07C 41/01 518/703 |
| 2013/0165534 A1* | 6/2013 | McComish | C10G 2/32 518/702 |
| 2013/0312328 A1 | 11/2013 | Xu et al. | |
| 2013/0312946 A1* | 11/2013 | Chan | F28D 1/02 165/281 |
| 2014/0158941 A1* | 6/2014 | Liu | C10J 3/482 252/373 |
| 2014/0311031 A1* | 10/2014 | Winter | C10J 3/72 48/101 |
| 2015/0060582 A1* | 3/2015 | Truce | B02C 23/12 241/38 |
| 2015/0083971 A1* | 3/2015 | Paskach | C10J 3/56 252/373 |
| 2015/0274978 A1* | 10/2015 | Hilbert | D21H 17/63 241/1 |

* cited by examiner

METHOD AND APPARATUS FOR RECYCLING ASH FINES

CROSS-REFERENCE TO RELATED APPLICATIONS

This application claims the benefit of U.S. Provisional Application No. 61/782,418, filed Mar. 14, 2013, which is incorporated by reference herein in its entirety. Another cross-referenced U.S. Provisional Application No. 61/782,227, filed Mar. 14, 2013 is also incorporated herein by reference.

FIELD OF THE INVENTION

The present invention relates to coal gasification using fluidized bed reactor. More specifically, the invention relates to a method and apparatus for recycling ash fines emanating from fluidized bed reactor to ash classifier of the fluidized bed reactor.

BACKGROUND OF THE INVENTION

Coal gasification is the process to convert carbonaceous materials into syngas primarily containing carbon monoxide and hydrogen. Fluidized bed reactors are often commonly used to gasify carboneous materials such as coal. An example of such a gasifier is provided in U.S. patent application Ser. No. 13/532,769 (hereinafter referred to as an "SES Gasifier"). A characteristic of such a gasifier is that the operating temperature of the gasifier is just below the melting point of the ash, and as such these gasifiers are called non-slagging gasifiers.

As shown in FIG. 1, feed stock which can be a variety of carbon containing materials is usually delivered to the gasifier's fluidized bed region 1 as small particles. As their carbon content is depleted, the small particles coalesce due to collision and fusion in the fluidized bed region 1, and become heavier than those particles whose carbon content is not yet depleted. The carbon-depleted ash particles then fall by gravity as solid ash particles from the fluid bed region of the gasifier, into an ash discharge device 4, which is vertically arranged underneath the fluid bed.

This discharge device 4 generally comprises a centrally located pipe 6 ("center jet pipe") at the bottom of the dense phase region of the gasifier. The center jet pipe is used to introduce jet gas which contains oxygen-rich gas at the bottom of the dense phase region, so as to form a high temperature region. This region is relative rich in oxygen, and the combustion reaction of the coal material improves carbon conversion.

The discharge device 4 may also be configured without the use of a center jet pipe 6, so long as the discharge device 4 is located at the bottom of the gasifier dense phase through which carbon depleted solids are removed and partially cooled.

Ash particles also undergo some separation between coarser and finer particles in the ash discharge device 4 integrated with a classifier 5. A gas stream, moving upwards through the discharge device, is often used to separate the ash particles, re-entraining those lighter and/or smaller particles whose carbon content is not yet depleted and returning them back into the reaction region, while allowing the heavier, carbon depleted ash particles to fall through. The gas stream also serves to cool the central pipe if the discharge device is configured with a central pipe. The gas flow in the discharge device generally operates at a higher gas velocity at least in the upper portion than the gasifier fluid bed and in some portions it may operate at a lower superficial gas velocity.

The gas flow needed for the ash discharge device to separate the ash particles, being steam or other gases, or a mixture thereof is usually in excess of the amount chemically needed for the gasification reaction and is at a lower temperature than the gasifier, hence it imposes an energy load on the gasifier which reduces the cold gas efficiency.

Referring to FIG. 2 as an example, in the SES U-gas technology, fine solid particles ("fines") also exit the gasifier from the top with the raw product syngas. These fines are captured, both as part of the process for cleaning the syngas, and for recycling the carbon content of the fines, usually via cyclones and/or filters 8.

Fines from the cyclone and filters downstream of the syngas cooler are recycled into the gasifier to boost carbon conversion and improve the amount of syngas produced per unit input of coal. Currently, these fines are transported directly into specific regions of the fluid bed 1 using dense phase or dilute phase conveying of solids by gas. The specific region is usually the higher temperature central region of the gasifier well below the top of the dense phase bed of fluidized material.

The gas used for the transportation purposes is referred to as the transport gas. The amount of the transport gas used to transport these solids increases as gasifier operating pressure increases. The transport gas necessarily has a lower temperature than the gasifier reaction region. Accordingly, it imposes a penalty on gasifier efficiency and increases oxygen consumption.

In addition, the increase in gas rate leaving the gasifier per unit of $H_2$ and CO produced increases the size of the gasification system equipment, such as cyclones, syngas cooler, and filters downstream of the gasifier. With high ash coals and at high pressures such as 40 bar, the fines transport gas could be as much at 5-10% of the total dry gas leaving the gasifier.

Therefore there is a need in the art for an improved gasification system and process wherein the penalty on gasifier efficiency imposed by the transport gas is decreased.

SUMMARY OF THE INVENTION

As discussed above, both the gas stream used to separate the ash particles and the transport gas used for the recycled fines transportation impose a doubled penalty on gasifier efficiency and increase oxygen consumption. This invention is based, at least in part, upon the discovery that introducing the recycled fines into the bottom of a gasifier which comprises an integrated solids residue discharge and classification device, thus replacing all or part of the separation gas ("classifier gas") used in the ash discharge device with the transport gas, is a simple solution to improve the heat efficiency of a fluidized bed gasifier.

Accordingly, in one aspect, the invention provides a method for recycling fine ash particles for a fluidized bed reactor, wherein solid feed stock is partially combusted in the fluidized bed region to produce an exit gas stream in which fine ash particles are entrained, and wherein the fluidized bed reactor comprises a reaction vessel, a conical gas distribution grid positioned in the reaction vessel which defines the bottom surface of the fluidized bed, a first venturi connected to the bottom of the gas distribution grid, and a classifier connected to the bottom of the first venturi. The method comprises separating the fine ash particles from the exit gas stream, using a transport gas stream to deliver the collected fine ash particles into the classifier wherein the transport gas is used as all or part of classifier gas.

In some embodiment of the method, the fine ash particles may be delivered into the classifier through one or more annular pipes using the transport gas stream.

In some embodiment of the method, a center jet pipe is located in the center of the classifier and the first venturi forms an annular space between the classifier and the center jet pipe, and the fine ash particles are delivered into the annular space.

In some embodiment of the method, the fine ash particles collected are delivered into the annular space through one or more annular pipes.

In some embodiment of the method, a second venturi is located below the point where the fine ash particles are delivered into the classifier, and a feed gas inlet is connected to a lower end of the classifier and below the second venturi for introducing up-flowing classifier gas.

In some embodiment of the method, the transport gas stream does not comprise oxygen.

In some embodiment of the method, the transport gas stream comprises nitrogen, carbon dioxide, hydrogen, syngas, steam or a mixture thereof.

In some embodiment of the method, one or more cyclones, one or more baghouse filter systems, one or more ceramic filters, one or more electric precipitators or a combination thereof, are used to separate or collect the fine ash particles from the exit gas stream.

According to another aspect of the present invention, it features a fluidized bed reactor in which solid feed stock is partially combusted in the fluidized bed reactor to produce an exit gas stream in which fine ash particles are entrained, and the fluidized bed reactor comprises a reaction vessel which comprises a conical gas distribution grid positioned in the lower portion of the reaction vessel, a first venturi connected to the bottom of the gas distribution grid, a classifier connected to the bottom of the first venturi, a fine ash particle collection system for separating the fine ash particles from the exit gas stream, and a fine ash particle conveyor system for using a transport gas stream to deliver the fine ash particles collected into the classifier wherein the transport gas is used as all or part of classifier gas.

In some embodiment of the fluidized bed reactor, the fine ash particle conveyor system delivers the fine ash particles into the classifier through one or more annular pipes.

In some embodiment of the fluidized bed reactor, the fluidized bed reactor further comprises a center jet pipe located in the center of the classifier and the first venturi forms an annular space between the classifier and the center jet pipe, and the fine ash particle conveyor system delivers fine ash particles collected into the annular space.

In some embodiment of the fluidized bed reactor, the fine ash particle conveyor system delivers the fine ash particles collected into the annular space through one or more annular pipes.

In some embodiment of the fluidized bed reactor, a feed gas inlet is connected to a lower end of the classifier for introducing up-flowing classifier gas, fluidized bed reactor further comprises a second venturi is located below the point where the fine ash particles are delivered into the classifier, and a feed gas inlet connected to a lower end of the classifier and below the second venturi for introducing up-flowing classifier gas.

In some embodiment of the fluidized bed reactor, the transport gas stream does not comprise oxygen. In some embodiment of the fluidized bed reactor, the transport gas stream comprises nitrogen, carbon dioxide, hydrogen, syngas, steam or a mixture thereof.

In some embodiment of the fluidized bed reactor, a fine ash particle collection system comprises one or more cyclones, one or more baghouse filter systems, one or more ceramic filters, one or more electric precipitators or a combination thereof, used to separate or collect the fine ash particles from the exit gas stream.

According to another aspect of the present invention, some embodiment provides a fluidized bed coal gasification system in which solid feed stock is partially combusted to produce an exit gas stream in which fine ash particles are entrained. The system comprises a reactor vessel which comprises an upper portion wherein a fluidized bed region is formed during operation, and wherein the exit gas stream is formed with fly ash particles entrained therein, a conical gas distribution grid positioned in the lower portion of the reactor vessel which defines the bottom surface of the fluidized bed and having a central opening at the apex wherein bottom ash formed in the fluidized bed region can fall through the central opening, a first venturi connected to the bottom of the gas distribution grid, a classifier connected to the bottom of the first venturi, a fine ash particle collection system for separating the fine ash particles from the exit gas stream, and a fine ash particle conveyor system for using a transport gas stream to deliver the fine ash particles collected into the classifier wherein the transport gas is used as all or part of classifier gas.

In some embodiment of the system, a fine ash particle conveyor system delivers the fine ash particles into the classifier through one or more annular pipes.

In some embodiment of the system, a center jet pipe is located in the center of the classifier and the first venturi forms an annular space between the classifier and the center jet pipe, and wherein the fine ash particle conveyor system delivers the fine ash particles into the annular space.

In some embodiment of the system, the fine ash particle conveyor system delivers the fine ash particles into the annular space through one or more annular pipes.

In some embodiment of the system, a feed gas inlet is connected to a lower end of the classifier for introducing up-flowing classifier gas, and the system further comprises a second venturi is located below the point where the fine ash particles are delivered into the classifier, and a feed gas inlet connected to a lower end of the classifier and below the second venturi for introducing up-flowing classifier gas.

In some embodiment of the system, the fine ash particle collection system comprises one or more stages of cyclone, one or more baghouse filter systems, one or more ceramic filters, one or more electric precipitators, or a combination thereof.

The above-mentioned and other features of this invention and the manner of obtaining and using them will become more apparent, and will be best understood, by reference to the following drawing and description.

DESCRIPTION OF THE INVENTION

The inventor of the present invention discovered that for high pressure operation, steam or some non-oxygen containing gas as transport gas used to carry recycle fines to the gasifier and the feed into the gasifier, as well as classifier gas, all of these gases impose a significant thermal penalty on the gasifier. Because they end up being heated to gasification temperature and then cooled in the syngas cooler which increases both oxygen and feed (e.g. coal) consumption per unit of $H_2$ and CO produced. Since the gas used for the transportation purposes may have the same composition as the gas stream used as classifier gas, it is desirable to combine at least two functions, e.g. combining transport gas for fines recycle and classifier gas into one, thus lowering the total amount of the gas used and increasing the gasifier overall efficiency in both oxygen and coal consumption.

The present invention provides an apparatus, a system and related methods, useful in a reactor for coal or biomass gasification, such as a fluidized bed reactor, for improving the heat efficiency of a fluidized bed gasifier by introducing the recycled fines into the ash discharge device below the gasifier, thus replacing all or part of the separation gas used in the ash discharge device with the gas used to transport the recycled fines.

Figure 1:
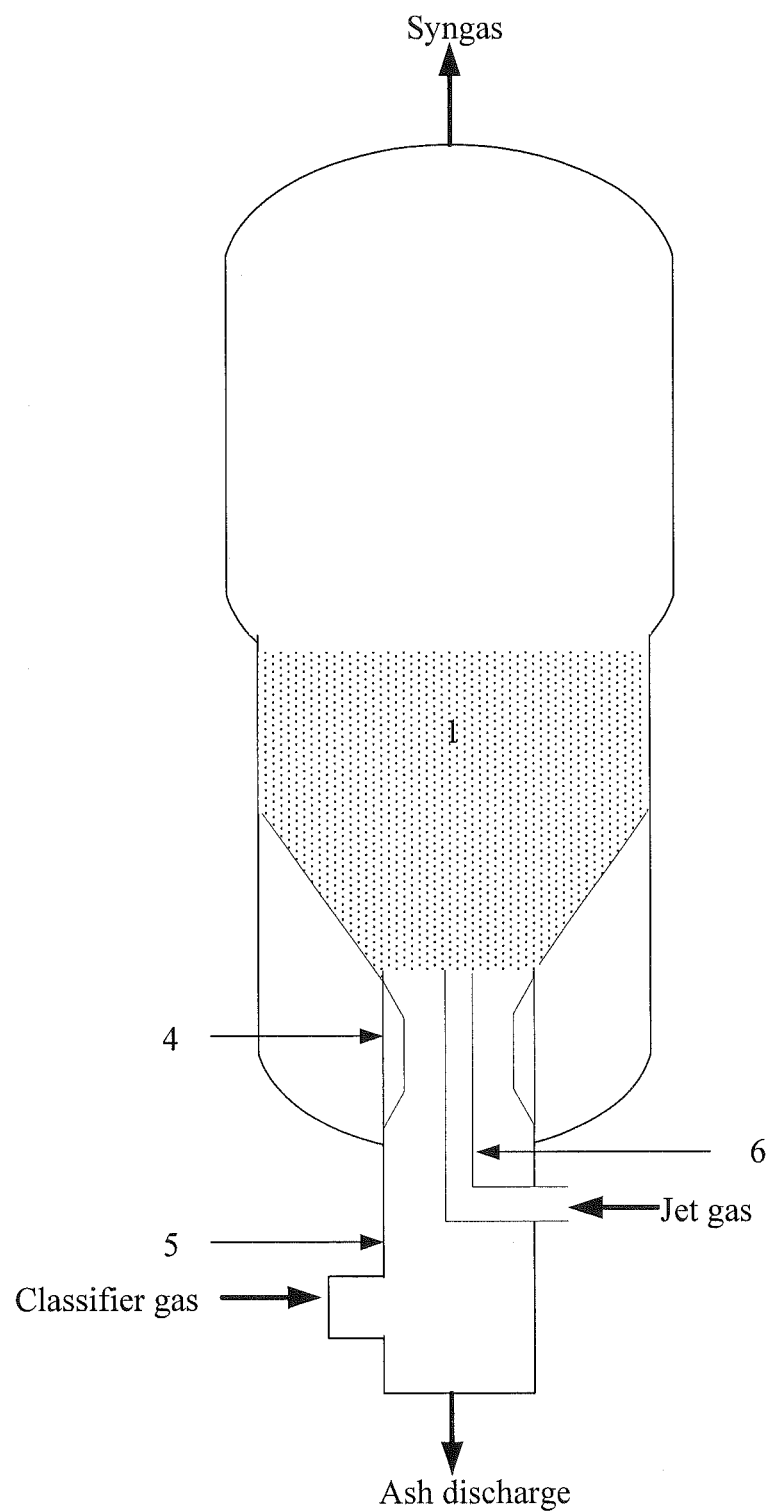
FIG. 1 is a schematic diagram showing a typical fluidized bed reactor for coal gasification in the art.
Figure 2:
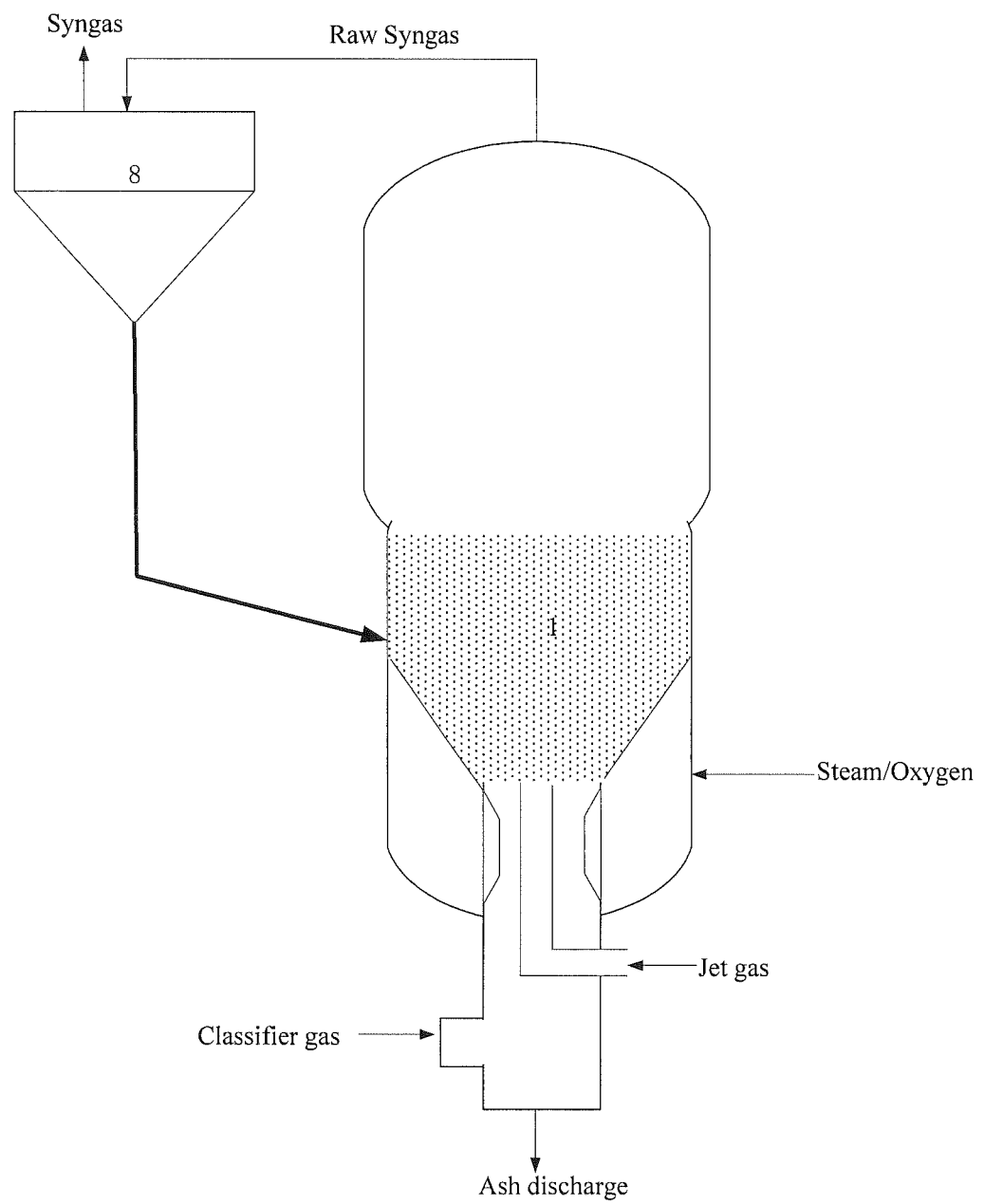
FIG. 2 is a schematic diagram showing a conventional fines recycling method to a fluidized bed reactor, wherein the recycled fines are delivered to the fluidized bed region within the fluidized bed reactor.
Figure 3:
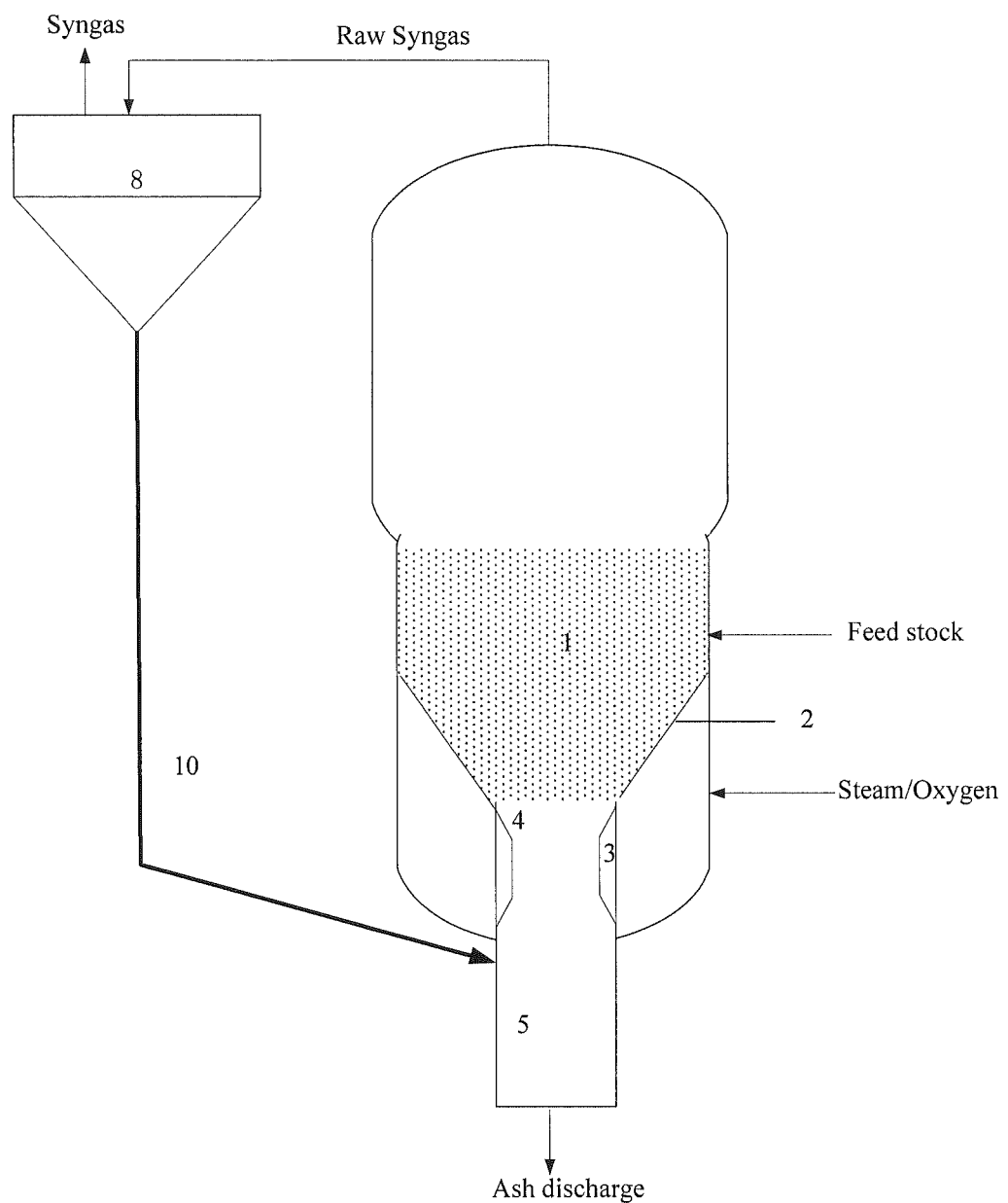
FIG. 3 illustrates the arrangement of components of a system according to one embodiment of the present invention, wherein the recycled fines are delivered to the ash discharge device at bottom of the fluidized bed reactor.

As shown in FIG. 3, in one embodiment of the fluidized bed reactor according to the present invention, solid feed stock is fed in the fluidized bed reactor and partially combusted in the fluidized bed reactor to produce an exit raw syngas stream in which fine ash particles are entrained. The fluidized bed reactor comprises a reaction vessel which comprising a conical gas distribution grid 2 positioned in the lower portion of the reaction vessel, a first venturi 3 connected to the bottom of the gas distribution grid 2, and a classifier 5 connected to the bottom of the first venturi 3. The discharge device 4 can be integrated with a classifier 5 to discharge a controlled amount of solids from the fluidized bed. The first venturi 3 performs the classification function.

A fine ash particle collection system 8 is used to separate the fine ash particles from the exit gas stream. A fine ash particle conveyor system 10 is for using a transport gas stream to deliver the fine ash particles collected in the fine ash particle collection system 8 into the classifier 5 wherein the transport gas is used as all or part of classifier gas. The fine ash particle conveyor system 10 may be via a jet stream of transport gas, e.g. a pneumatic conveyor system, carried in a pipe.

It should be understood that, the transport gas can be used only as part of the classifier gas. Therefore, additional classifier gas may be needed. In this case, a feed gas inlet can be connected to a lower end of the classifier 5 for introducing up-flowing classifier gas.

The gas used for the transportation purposes normally has no requirement other than that it does not contain oxygen. The classifier gas used for the separation in the classifier 5 usually comprises steam or other gases. Since the gas used for the transportation purposes can have the same composition as the gas stream used in the ash classifier 5, the transport gas can be used to replace at least part of the classifier gas.

For example, steam can be commonly used as transport gas. The fluidizing and separation gas used in the ash discharge device is typically steam as well, so to the extent that the steam used in the fines transport gas displaces steam used in the classifier, steam consumption of the gasifier is reduced.

In one embodiment of the fluidized bed reactor, the transport gas stream does not comprise oxygen. The transport gas stream may comprise nitrogen, carbon dioxide, hydrogen, syngas, steam or a mixture thereof.

Since a portion of the ash discharge device operates at higher velocities than the gasifier, much of the recycled fine solids will be entrained back to the gasifier into the high temperature central region, thus achieving the same objectives as feeding them to the lower central zone of the gasifier dense phase bed. No signification alteration to the gasifier configuration is otherwise needed. The net effect is that the functions of the classifier and fines recycle can both be preserved with a lower consumption of gas used to achieve both functions.

Figure 4:
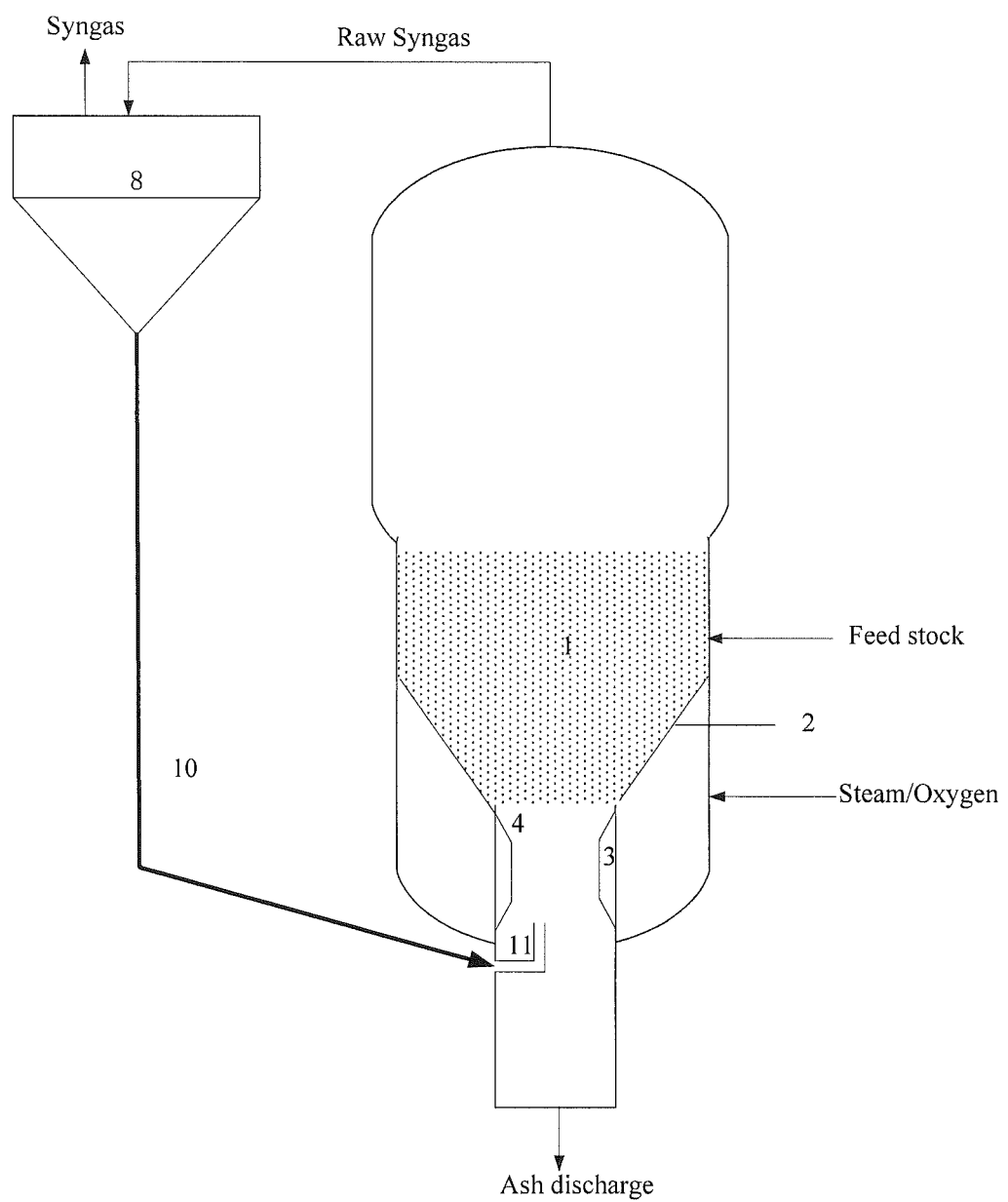
FIG. 4 illustrates another specific embodiment of the present invention, wherein the recycled fines delivered to the ash discharge device by the transport gas preferably are delivered through an annular pipe.

FIG. 4 illustrates another specific embodiment of the present invention, wherein the recycled fines delivered to the classifier 5 by the transport gas preferably are delivered through an annular pipe 11, but not directly to the ash discharge device, thus reducing the impact on the high pressure gasifier. Accordingly, in some embodiment, the fine ash particle conveyor system 10 delivers the fine ash particles into the classifier 5 through more than one annular pipe 11.

Figure 5:
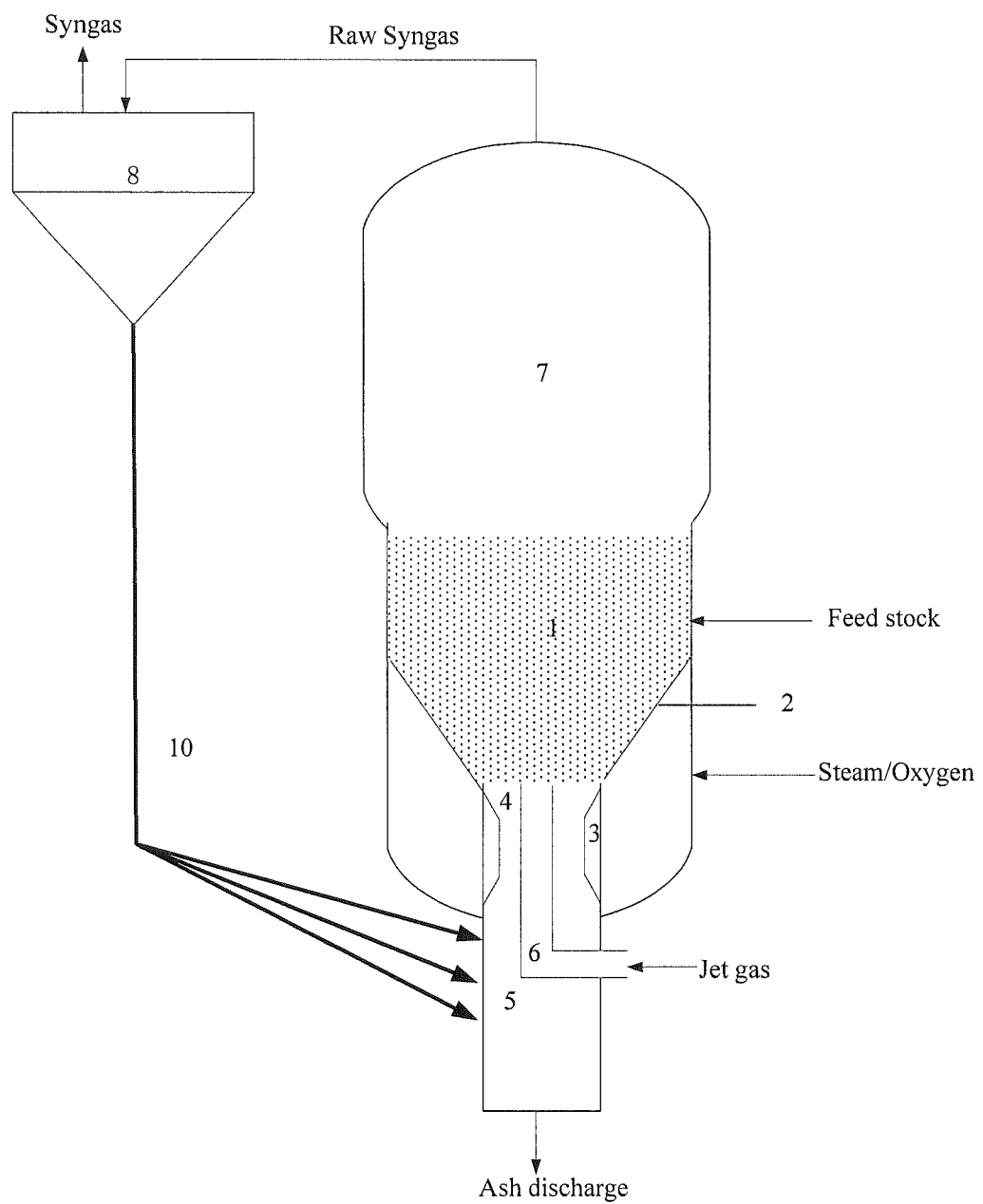
FIG. 5 illustrates another specific embodiment of the present invention, wherein the recycled fines delivered by the transport gas preferably are delivered to the annular space of the ash discharge device.

FIG. 5 illustrates another specific embodiment of the present invention. The fluidized bed reactor further comprises a center jet pipe 6 located in the center of the classifier 5 and the first venturi 3 forming an annular space between the classifier 5 and the center jet pipe 6. The fine ash particle conveyor system 10 can deliver fine ash particles collected into the annular space through one or more inlets on the classifier 5.

Figure 6:
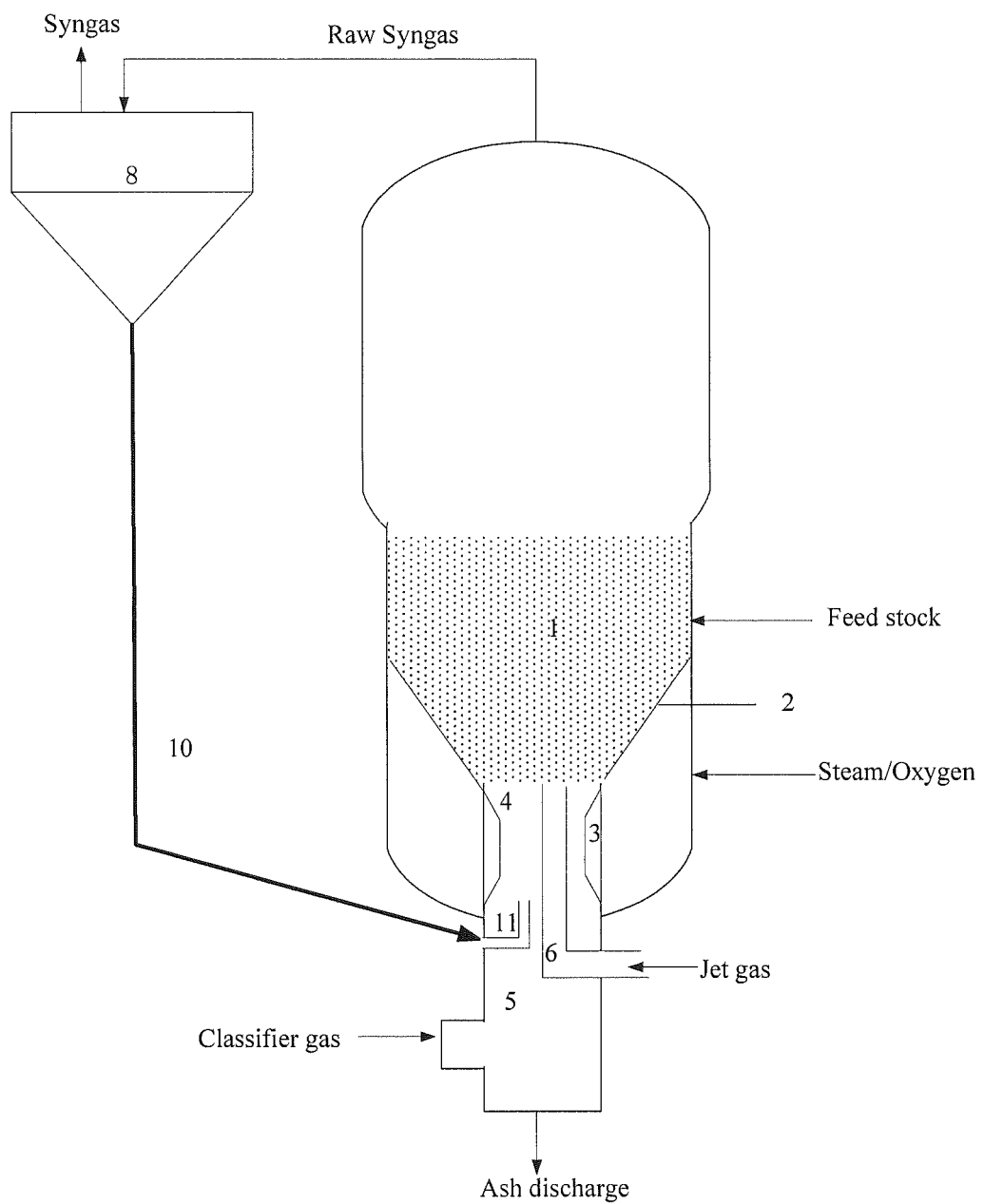
FIG. 6 illustrates another specific embodiment of the present invention, wherein the recycled fines delivered by the transport gas preferably are delivered to the annular space of the ash discharge device through an annular pipe.

FIG. 6 illustrates another specific embodiment of the present invention. Compared with the embodiment in FIG. 5, the fine ash particle conveyor system 10 can deliver the fine ash particles collected into the annular space through one or more annular pipes 11.

Figure 7:
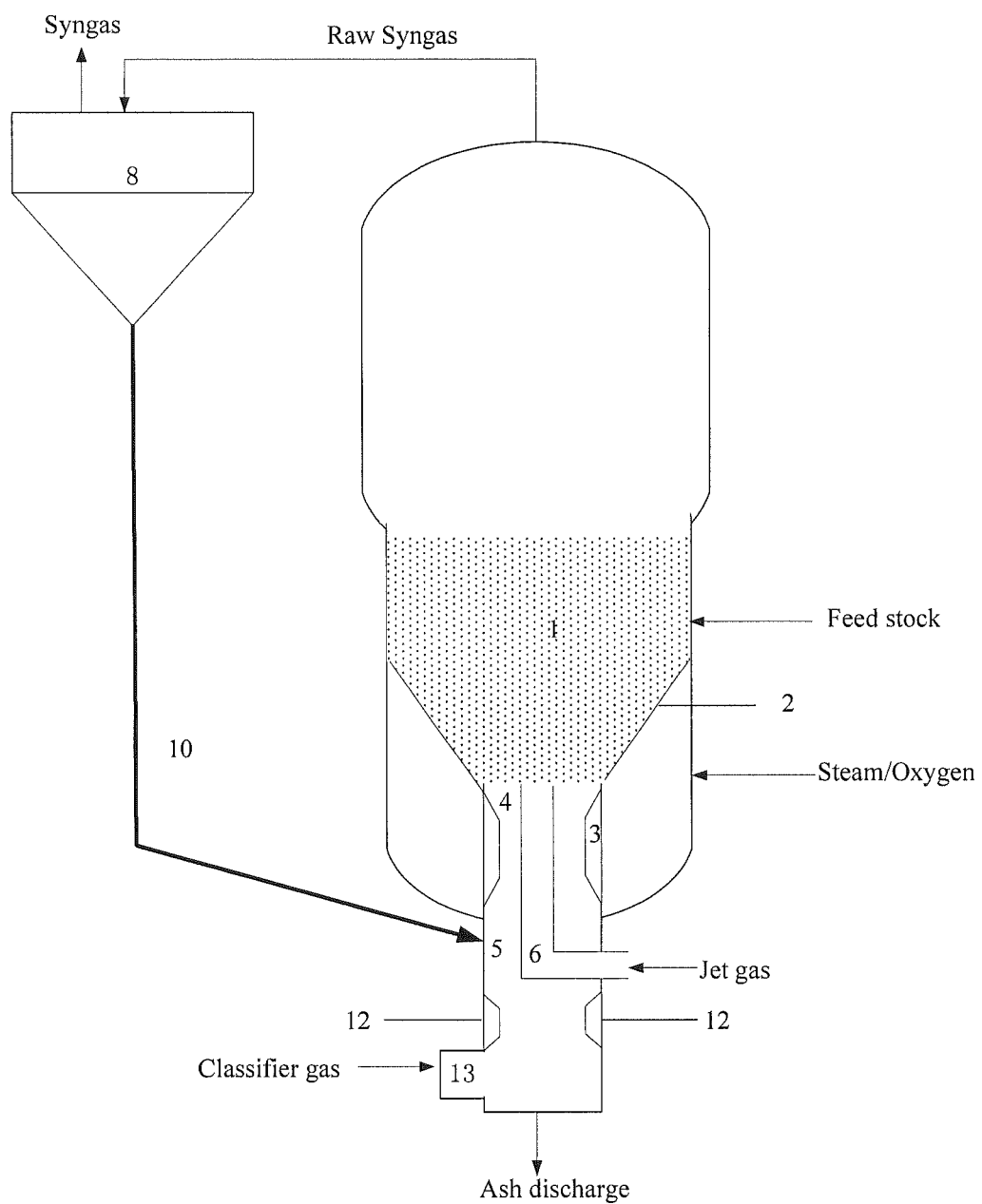
FIG. 7 illustrates another specific embodiment of the present invention, wherein a second venturi is located below the point where the recycled fines are introduced into the classifier.

FIG. 7 illustrates another specific embodiment of the present invention. In some embodiment of the fluidized bed reactor, the fluidized bed reactor further comprises a second venturi 12 located below the point where the recycled fines are introduced into the classifier to further enhance separation. A feed gas inlet 13 can be connected to a lower end of the classifier 5 below the second venturi 12 for introducing up-flowing classifier gas so that the recycled fines further react with the up-flowing classifier gas.

In one embodiment of the fluidized bed reactor, a fine ash particle collection system may comprise one or more cyclones, one or more baghouse filter systems, one or more ceramic filters, one or more electric precipitators or a combination thereof, used to separate or collect the fine ash particles from the exit gas stream.

According to another aspect of this invention, a fluidized bed coal gasification system is provided. Solid feed stock is partially combusted to produce an exit gas stream in the system and fine ash particles are entrained, the system comprises a reactor vessel which comprises an upper portion wherein a fluidized bed region is formed during operation, and wherein the exit gas stream is formed with fly ash particles entrained therein, a conical gas distribution grid positioned in the lower portion of the reactor vessel which defines the bottom surface of the fluidized bed and having a central opening at the apex wherein bottom ash formed in the fluidized bed region can fall through the central opening, a first venturi connected to the bottom of the gas distribution grid, a classifier connected to the bottom of the first venturi, a fine ash particle collection system for separating the fine ash particles from the exit gas stream, and a fine ash particle conveyor system for using a transport gas stream to deliver the fine ash particles collected into the classifier wherein the transport gas is used as all or part of classifier gas.

In one embodiment of the system, the fine ash particle conveyor system delivers the fine ash particles into the classifier through one or more annular pipes.

In one embodiment of the system, a center jet pipe is located in the center of the classifier and the first venturi forms an annular space between the classifier and the center jet pipe, and wherein the fine ash particle conveyor system delivers the fine ash particles into the annular space.

In one embodiment of the system, the fine ash particle conveyor system delivers the fine ash particles into the annular space through one or more annular pipes.

In one embodiment of the system, a feed gas inlet is connected to a lower end of the classifier for introducing up-flowing classifier gas, and the system further comprises a second venturi located below the point where the fine ash particles are delivered into the classifier.

In one embodiment of the system, the fine ash particle collection system comprises one or more stages of cyclone, one or more baghouse filter systems, one or more ceramic filters, one or more electric precipitators, or a combination thereof.

The present invention further provides a method for recycling fine ash particles for a fluidized bed reactor, wherein solid feed stock is partially combusted in the fluidized bed region to produce an exit gas stream in which fine ash particles are entrained, and wherein the fluidized bed reactor comprises a reaction vessel, a conical gas distribution grid positioned in the reaction vessel which defines the bottom surface of the fluidized bed, a first venturi connected to the bottom of the gas distribution grid, and a classifier connected to the bottom of the first venturi, the method comprising separating the fine ash particles from the exit gas stream, and using a transport gas stream to deliver the fine ash particles collected into the classifier wherein the transport gas is used as all or part of classifier gas.

In one embodiment of the method, the fine ash particles are delivered into the classifier through one or more annular pipes using the transport gas stream.

In one embodiment of the method, a center jet pipe is located in the center of the classifier and the first venturi forms an annular space between the classifier and the center jet pipe, and wherein the fine ash particles collected are delivered into the annular space.

In one embodiment of the method, the fine ash particles collected are delivered into the annular space through one or more annular pipes.

In one embodiment of the method, the transport gas stream does not comprise oxygen. In one embodiment of the method, the transport gas stream comprises nitrogen, carbon dioxide, hydrogen, syngas, steam or a mixture thereof.

In one embodiment of the method, one or more cyclones, one or more baghouse filter systems, one or more ceramic filters, one or more electric precipitators or a combination thereof, used to separate or collect the fine ash particles from the exit gas stream.

It is understood that examples and embodiments described herein are for illustrative purpose only and that various modifications or changes in light thereof will be suggested to persons skilled in the art and are to be included within the spirit and purview of this application and scope of the appended claims. All publications, patents and patent applications cited in this patent are hereby incorporated by reference for all purposes.

One or more features from any embodiment maybe combined with one or more features of any other embodiment without departing from the scope of the disclosure. The above description is illustrative and is not restrictive. Many variations of the invention will become apparent to those skilled in the art upon review of the disclosure. The scope of the invention should, therefore, be determined not with reference to the above description, but instead should be determined with reference to the claims along with their full scope or equivalents.

What is claimed is:

1. A fluidized bed reactor in which solid feed stock is partially combusted to produce an exit gas stream and fine ash particles that are entrained, the reactor comprising:
    a reaction vessel, which contains a conical gas distribution grid positioned in the lower portion of the reaction vessel, a first venturi connected to the bottom of the gas distribution grid, and a classifier for classifying ash particles by their sizes, the classifier connected to the bottom of the first venturi;
    a fine ash particle collection system using a classifier gas to separate the fine ash particles from the exit gas stream; and
    a fine ash particle conveyor system connected to the classifier for using a transport gas to deliver the fine ash particles into the classifier wherein the transport gas is used as all or part of the classifier gas.

2. The fluidized bed reactor according to claim 1, wherein the fine ash particle conveyor system delivers the fine ash particles into the classifier through one or more annular pipes using the transport gas.

3. The fluidized bed reactor according to claim 1, further comprising a center jet pipe located in the center of the classifier, wherein the first venturi forms an annular space between the classifier and the center jet pipe, and the fine ash particle conveyor system delivers the fine ash particles collected into the annular space.

4. The fluidized bed reactor according to claim 3, wherein the fine ash particle conveyor system delivers the fine ash particles collected into the annular space through one or more annular pipes.

5. The fluidized bed reactor according to claim 1, further comprising:
    a second venturi located below the point where the fine ash particles are delivered into the classifier, wherein a feed gas inlet is connected to a lower end of the classifier and below the second venturi for introducing up-flowing classifier gas.

6. The fluidized bed reactor according to claim 1, wherein the transport gas stream does not comprise oxygen.

7. The fluidized bed reactor according to claim 1, wherein the transport gas stream comprises nitrogen, carbon dioxide, hydrogen, syngas, steam, or a combination thereof.

8. The fluidized bed reactor according to claim 1, wherein the fine ash particle collection system comprises one or more cyclones, one or more baghouse filter systems, one or more ceramic filters, one or more electric precipitators, or a combination thereof, the fine ash particle collection system used to separate or collect the fine ash particles from the exit gas stream.

9. A fluidized bed coal gasification system in which solid feed stock is partially combusted to produce an exit gas stream and fine ash particles are entrained, the system comprising:
- a reactor vessel, which comprises an upper portion, a conical gas distribution grid positioned in the lower portion of the reactor vessel, a first venturi connected to the bottom of the gas distribution grid, and a classifier for classifying ash particles by their sizes, the classifier connected to the bottom of the first venturi;
- a fine ash particle collection system using a classifier gas to separate the fine ash particles from the exit gas stream; and
- a fine ash particle conveyor system for using a transport gas to deliver the fine ash particles into the classifier wherein the transport gas is used as all or part of the classifier gas, whereby, in the upper portion of the reactor vessel, a fluidized bed region is formed during operation and the exit gas stream is formed with fly ash particles entrained; and the conical gas distribution grid is located at the bottom surface of the fluidized bed region, the conical gas distribution grid having at an apex a central opening which allows the ash formed in the fluidized bed region to fall through.

10. The fluidized bed coal gasification system according to claim 9, wherein the fine ash particle conveyor system delivers the fine ash particles into the classifier through one or more annular pipes.

11. The fluidized bed coal gasification system according to claim 9, wherein a center jet pipe is located in the center of the classifier, the first venturi forms an annular space between the classifier and the center jet pipe, and the fine ash particle conveyor system delivers the fine ash particles into the annular space.

12. The fluidized bed coal gasification system according to claim 11, the fine ash particle conveyor system delivers the fine ash particles into the annular space through one or more annular pipes.

13. The fluidized bed coal gasification system according to claim 9, further comprising a second venturi located below the point where the fine ash particles are delivered into the classifier,
- wherein a feed gas inlet is connected to a lower end of the classifier and below the second venturi for introducing up-flowing classifier gas.

14. The fluidized bed coal gasification system according to claim 9, wherein the fine ash particle collection system comprises one or more stages of cyclone, one or more baghouse filter systems, one or more ceramic filters, one or more electric precipitators, or a combination thereof.

* * * * *